Aug. 18, 1970  M. H. CRASTE  3,524,326
METHOD AND MEANS FOR NEUTRALIZING SWELL DURING SUBMARINE
PIPELINE LAYING OPERATIONS
Filed May 21, 1968

United States Patent Office 3,524,326
Patented Aug. 18, 1970

3,524,326
METHOD AND MEANS FOR NEUTRALIZING SWELL DURING SUBMARINE PIPELINE LAYING OPERATIONS
Maurice H. Craste, Boulogne-sur-Seine, France, assignor to Societe des Grands Travaux de Marseille, Societe Anonyme, Paris, France
Filed May 21, 1968, Ser. No. 730,802
Claims priority, application France, May 31, 1967, 108,554, Patent 1,532,570
Int. Cl. F16l 1/00
U.S. Cl. 61—72.3     3 Claims

ABSTRACT OF THE DISCLOSURE

A pontoon on which are mounted a rectilinear pipeline laying beam, a pair of relatively long rods pivotally mounted about a fixed transverse axis connected to said laying beam, a collar adapted to clamp the pipeline end and pivotally mounted about a transverse axis at the end of said relatively long rods, in combination with two sets of rollers having their supports also rigid with said pipeline laying beam, said sets of rollers being each adapted to clamp said pipeline while permitting slight movements thereof along its axis.

BACKGROUND OF THE INVENTION

A known method of laying submarine pipelines from pontoons specially designed for this purpose, which is particularly advantageous for relatively great sea depths, consists in applying to the pipeline end a force and a torque such that the stress produced at any point along the pipeline being laid remains inferior to permissible values.

If the torque is zero, to each depth there corresponds a minimum value and a maximum value between which said force must be maintained. These minimum and maximum values are subordinate to the specific characteristics of the pipeline to be laid (diameter, thickness, coating, etc.). At a certain depth the minimum and maximum values are coincident and beyond this depth the problem is insoluble.

The pipeline is laid by fastening an additional section to the end of the pipeline being laid, whereafter the pipeline laying pontoon is moved forwards to lay on the sea bottom a pipeline length equal to that of said additional section, and so forth. During these successive operations an action must be exerted on the pipeline being laid with a view to prevent said stress from exceeding the permissible values at any point along the pipeline.

It is also necessary, for example in case of bad weather, to have the possibility of laying on the sea bottom the pipeline portion being immersed, and to subsequently raise said portion again, when normal laying conditions are resumed.

Finally, the possibility must also be preserved of commencing the laying operation at the structure from which the pipeline is to extend (immersed oil well top, underwater tank, drilling rig, etc.) and completing the pipeline at the delivery structure. Now these last-mentioned problems must be dealt with in each specific case as a function of local conditions and of the type of connections to be made.

The operation consisting in connecting the additional pipeline section to the end of the pipeline portion being laid is greatly facilitated if during the operation this end is substantially fixed with respect to the pontoon; this operation may be carried out in any of the following manners: manual welding, flux welding, automatic welding in an inert gas atmosphere, screwing, etc.

SUMMARY OF THE INVENTION

It is the essential object of the present invention to provide a device for laying pipelines on the sea bottom by the so-called pure-tension method, so that all the successive operations necessary for laying the pipeline can be performed even when the well has an amplitude of the order of six or seven feet, without allowing the stress exerted on the pipeline being laid to exceed the permissible values at any point thereof. This device also permits the laying on the sea bottom and the subsequent raising therefrom of the pipeline if particularly severe weather conditions created sea conditions likely to jeopardize the safety and success of the laying operation arise, in spite of the valuable assistance provided by said device.

To this end, according to a first feature characterizing this invention, the device comprises a first collar adapted to clamp said pipeline being laid at a point adjacent its end, said first collar being pivoted through relatively long rods to a transverse axis connected to the laying beam of the pontoon, in combination with two sets of rotary rollers also connected to said beam and each adapted to clamp said pipeline while permitting slight axial movements thereof.

With this layout the additional pipeline section can be assembled with the pipeline, beyond the end thereof clamped by said two sets of rollers and to which only minor axial movements not likely to interfere with the operation are applied.

This device is further characterized in that it comprises another collar adapted to clamp the previously assembled pipeline section in the vicinity of its end, said second collar being connected through rods to a fixed transverse shaft carried by a tolley adapted to slide along the laying beam pivotally mounted on the pontoon so that the desired inclined position can be given thereto, said trolley being responsive to a traction exerted by means of a cable.

With this layout the traction firstly exerted on the first collar can be transferred to the trolley to which said second collar is attached when a new pipeline section has just been connected to the preceding ones, adequate means being provided in a manner known per se so that the sum of these tractive efforts remain constant throughout the transfer operation; upon completion of this transfer operation, after the first collar and the two sets of clamping rollers have been opened, the full cable traction is received by the trolley which transfers same to a point adjacent the pipe end without exerting any torque thereon due to the pivotal connection provided between the second collar and the trolley.

Finally, this device is characterized in that it comprises in combination with the assembly consisting of said second collar adapted to clamp the previously assembled pipeline section near its end, and of the trolley associated therewith, a circular ramp constituting the extension of the rectlinear section of the conventional laying ramp, said circular ramp being provided with rollers having transverse axes, the tangent to the upstream end of said circular ramp being parallel to said rectilinear beam.

When the aforesaid second collar has completed its downward stroke and said trolley is stationary in relation to the pontoon, in case of pitch movement of the pontoon and ramp assembly the pipeline will bear now and then on said ramp and behave practically as if it were articulated at the level of said second collar.

Then the first collar can be fitted again, as well as the aforesaid first stationary two sets of rollers and subsequently gradually transfer the tension from said second collar and said trolley to said first collar and, when this transfer is completed, unclamp said second collar and cause said trolley to slide upwards on the beam provided to this end, so that another beam section can be assembled, and so forth.

This layout may also be used, for example in case of bad weather, for laying the pipeline on the sea bottom and raising same again later on; to this end, a head is provided which is adapted to be secured to the end of the pipeline being laid, so as to seal this end, this head comprising a shaft and a hook to which the cable end may be anchored after having detached this end from the trolley supportng the second collar.

BRIEF DESCRIPTION OF THE DRAWING

The attached drawing shows in diagrammatic form the principle of this invention in order to afford a clearer understanding of the manner in which the desired results can be obtained, the drawing also showing a specific form of embodiment of the means contemplated for obtaining these results. In the drawings.

DESCRIPTION OF THE PREFERRED EMBODIMENT

Figure 1:
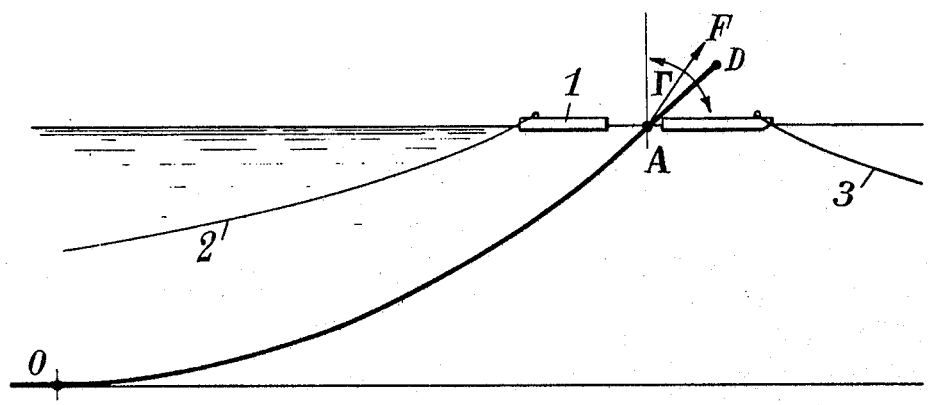
FIGS. 1 and 2 are diagrams illustrating the pipeline laying operations.
Figure 2:
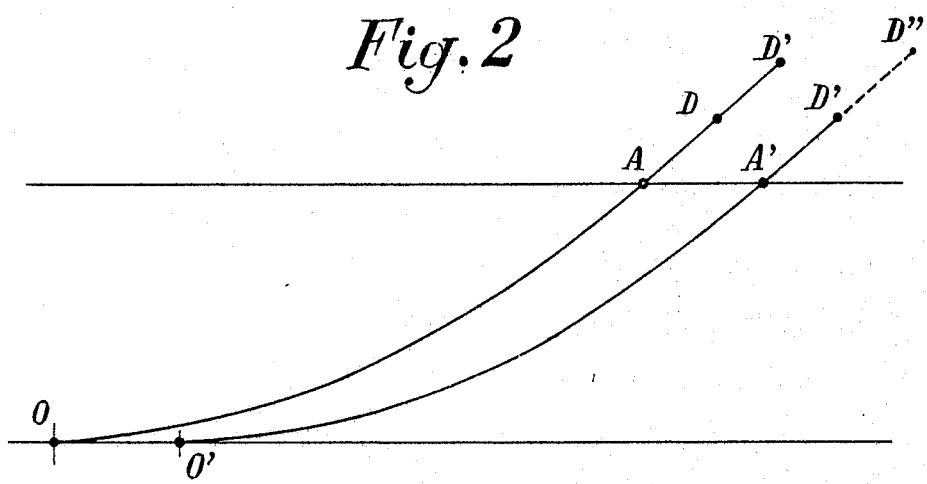

The pipeline laying pontoon 1 anchored to warps 2 and 3 carries the pipeline section OD being laid and is designed with a view to exert a force F and a torque Γ on the end A of this pipeline section; the essential laying operations proper consist in assembling at D an additional pipeline section DD′ (FIG. 2), then moving the pontoon forwards by releasing and pulling respectively the warps 2 and 3 so as to lay on the sea bottom a pipeline length OO′, the section being laid thus becoming O′D′, of same length as OD, the point of application of the stress being transferred from A to A′, with $AA' = OO' = DD'$, and finally assembling another pipeline section D′D″ equal to DD′, and so forth.

In order to ascertain whether the above-defined characteristics permit the laying of pipelines even when the swell has an amplitude of the order of 6 or 7 feet without exerting on the pipelines stress exceeding the permissible values, it will be necessary firstly to study the action exerted by the pontoon movements resulting from a swell of this amplitude on the pipeline being laid.

Pipeline laying pontoons now in service have a width of about 100 feet and a length in the range of 300 to 400 feet. As a rule, they are moored to eight anchors by means of warps, either directly or through a certain length of chain.

If the pipeline laying operations are to remain within reasonably economical limits, these operations should not be stopped by swells having an amplitude of less than 7 feet. Therefore, the amplitude of the movements set up by swells having an amplitude of about 6 or 7 feet and various frequencies and directions, have been studied on pontoon in actual service.

With certain swells having well-defined frequency and direction the pitch and the fore and aft movements of the pontoon attain respective amplitudes of ±2.5% and ±0.75 meter (ca 30″) with respect to the mean position. On the other hand, the pontoon's forward motion is practically in phase with the nose-lifting movement of the pontoon.

Under different circumstances, pounding was exceptionally as high as ±1 m. (40″), the maximum and minimum corresponding roughly to the moment whereat the fore and aft movement was zero as well as the angle of pitch.

The lateral movement of the pontoon, the yawing thereof (i.e. a rotation about a vertical axis) and the roll has little influence on the pipeline being laid. However, a very strong roll (>10%) was observed very exceptionally as a consequence of a sudden lateral swell.

Figure 3:
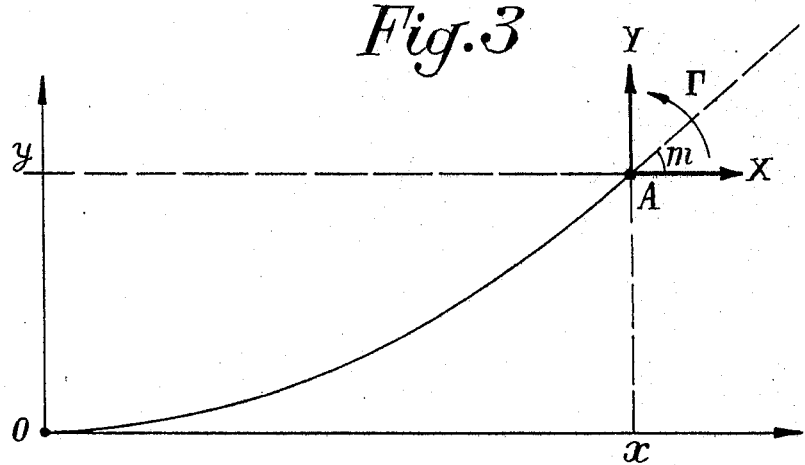
FIG. 3 is a similar view showing the diagram of forces.

The effect produced on the pipeline OA being laid (FIG. 3) by pontoon movements having the order of magnitude mentioned hereinabove were as follows:

Let $x$ and $y$ be the coordinates of A, $m$ being the pipeline inclination at A, and X, Y the horizontal and vertical components of the force applied at A, Γ being the torque (a positive torque in the direction shown in FIG. 3).

Assuming that.

$\Gamma = 0$ $X = 27.5T$ (above the minimum permissible value)

$Y = 18.6T$, as determined by the equilibrium of the pipe line $F = 33.2T$, for a laying depth of 87 m. (285 ft.) the effects of:

a variation $\delta y$
a variation $\delta m$
a variation $\delta x$ pounding, pitch, longitudinal movement of the laying pontoon have been studied in the case of a pipe line having an outer diameter of 50 cm. (20″), a wall thickness of 1.5 cm. (0.6″), coated with a 8-mm. thick layer (0.315″) of black product, and with 5 cm. (2″) of concrete.

(1) Case of a pipe line fixed at A:

(a) Pounding

For:

$\delta y = 1$ m. (40″)
$\delta x = 0$
$\delta m = 0$ we obtain:

$\delta X = 2,940$ kg. (6,482 lbs.)
$\delta Y = 1,000$ kg. (2,205 lbs.)
$\delta \Gamma = 15,100$ kgm. (108,850 ft. lbs.) introducing a 6.32 kg./sq. mm. stress in the pipe line, ie. 8,989 p.s.i.)

For $\delta y = -1$ m. we have thus:

$X + \delta X = 27,500 - 2,940$ kg. $= 24,560$ kg. (or 45,326 lbs.) which is permissible $Y + \delta Y = 18,600 - 1,000$ kg. $= 17,600$ kg. (38,800 lbs.)

$\Gamma + \delta \Gamma = -15,000$ kgm. (109,000 ft.-lbs.)

The maximum amplitude of the pounding corresponds to the moment when the longitudinal movement and the pitch angle are practically zero. It is not detrimental to the pipeline.

(b) Pitch

For:

$\delta y = 0$
$\delta x = 0$
$\delta m = +2.5\%$ we have:

$\delta X = 6,180$ kg. (13,600 lbs.)
$\delta Y = 2,480$ kg. (5,460 lbs.)
$\delta \Gamma = 51,900$ kgm. (374,000 ft.-lbs.)

(c) Longitudinal movement

For:

$\delta x = 0.75$m. (about 30″)
$\delta y = 0$
$\delta m = 0$ we obtain:

$\delta X = 9,200$ kg. (20,000 lbs.)
$\delta Y = 2,740$ kg. (6,040 lbs.)
$\delta \Gamma = 54,100$ kgm. (390,000 ft.-lbs.)

Since these two movements are in phase, the end result is as follows:

For:
$$\delta y = 0$$
$$\delta x = 0.75 \text{ m. (ca. 30'')}$$
$$\delta m = -2.5\%$$
$X + \delta X = 27,500 - 15,280 = 12,220$ kg. (26,900 lbs.)
$Y + \delta Y = 18,600 - 5,220 = 13,380$ kg. (29,450 lbs.)
$\Gamma + \delta \Gamma = 0 - 106,000 = -106,000$ kgm. (764,000 ft.-lbs.)

For:
$$\delta y = 0$$
$$\delta x = +0.75 \text{ m. (ca. 30'')}$$
$$\delta m = +2.5\%$$
$X + \delta X = 27,500 + 15,280 = 42,780$ kg. (94,250 lbs.)
$Y + \delta Y = 18,600 + 5,220 = 23,820$ kg. (52,500 lbs.)
$\Gamma + \delta \Gamma = 0 + 106,000 = 106,000$ kgm. (764,000 ft.-lbs.)

This is obviously unacceptable for on the one hand $X + X$ should not have a too low value if it is desired to keep the permissible stress values at about 0, and on the other hand a 106,000-kgm. moment (764,000 ft.-lbs.) corresponds to a 44.2 kg./sq. mm. stress (62,866 p.s.i.) in the pipeline.

Figure 4:
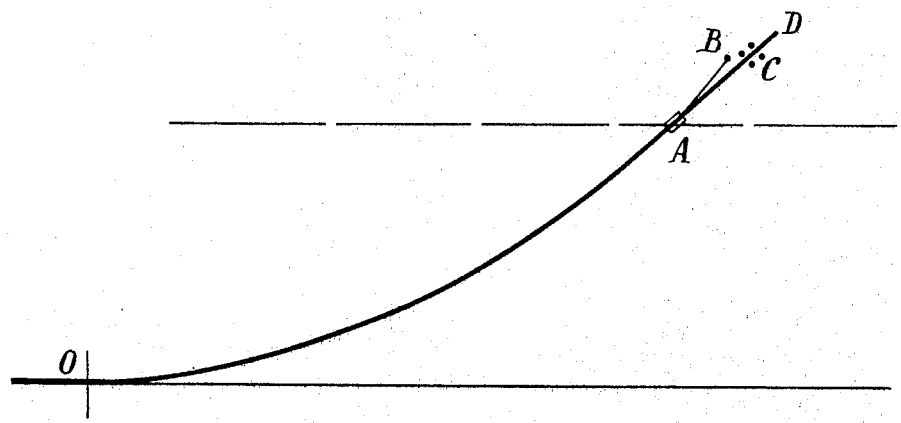
FIGS. 4 and 5 are similar views showing the essential characteristics of the device according to the present invention.

(2) Case of a pipeline fastened to the pontoon by means of the damping device according to the first feature of the invention:

This device is illustrated diagrammatically in FIG. 4. The pipeline is maintained at A by means of a collar pivoted on two relatively long rods AB and its direction is determined at C by a set of rollers permitting the axial movement of the pipeline. The point B and roller C are fixed in relation to the pontoon.

The example was calculated by assuming that $AC = 10$ m. (33 ft.), $AB \cong 5$ m. (16½ ft.); $x_0, y_0$ being the coordinates of C, $m_0$ the inclination of the set of rollers, $x$ and $y$ the coordinates of A, $m$ the pipeline inclination at A.

If:
$$\delta x_0 = 0.75 \text{ m. (ca. 30'')}$$
$$\delta y_0 = 0$$
$$\delta m_0 = 0$$
we obtain:
$$\delta X = 4,370 \text{ kg. (10,500 lbs.)}$$
$$\delta Y = 1,370 \text{ kg. (3,020 lbs.)}$$
$$\delta \Gamma = 14,810 \text{ kg. (106,800 ft.-lbs.)}$$

the moment at C in the pipeline is 27,970 kgm. (201,000 ft.-lbs.)

For:
$$\delta m_0 = 2.5\%$$
$$\delta x_0 = 0$$
$$\delta y_0 = 0$$
we obtain:
$$\delta X = 2,350 \text{ kg. (5,180 lbs.)}$$
$$\delta Y = 764 \text{ kg. (1,682 lbs.)}$$
$$\delta \Gamma = 18,080 \text{ kgm. (130,000 lbs. ft.)}$$

the moment at C in the pipeline is: 24,900 kgm. (178,500 ft.-lbs.)

The combination of the two movements gives the following results:

For:
$$\delta y_0 = 0$$
$$\delta x_0 = 0.75 \text{ m. (30'')}$$
$$\delta m_0 = 2.5\%$$
$X + \delta X = 27,500 - 6,720$ kg. $= 20,780$ kg. (45,800 lbs.)
$Y + \delta Y = 18,600 - 2,134$ kg. $= 16,466$ kg. (36,250 lbs.)
$\Gamma + \delta \Gamma = 0 - 32,890 = -32,890$ kgm. (-236,000 ft.-lbs.)
Moment at C in the pipeline: -52,870 kgm. (380,000 ft.-lbs.) corresponding to 24 kg. per sq. mm. or 34,135 p.s.i)

For:
$$\delta y_0 = 0$$
$$\delta x_0 = 0.75 \text{ m. (30'')}$$
$$\delta m_0 = 2.5\%$$
$X + \delta X = 27,500 + 6,720 = 34,220$ kg. (75,400 lbs.)
$Y + \delta Y = 18,600 + 2,134 = 20,734$ kg. (46,700 lbs.)
$\Gamma + \delta \Gamma = 0 + 32,890 = 32,890$ kgm. (236,000 ft.-lbs.)
Moment at C in the pipeline: +52,870 kgm.

The maximum stress in pipeline section OA lies at O and is 17.5 kg. per sq. mm. (24,890 p.s.i.).

At C the maximum stress is 24 kg./sq. mm. (34,135 p.s.i.).

Since the case considered herein deals with exceptional circumstances, it can be admitted if the steel grade has an elastic limit of at least 36 kg./sq. mm. (51,203 p.s.i.).

(3) Case of a pipeline secured to the pontoon by means of the device according to the second and third features characterizing this invention:

A traction is exerted at X in a direction approximating the pipeline axis OX being laid (FIG. 4) without producing any moment (for example by clamping the pipeline by means of the collar pivotally mounted on a pair of relatively long rods). This pipeline bears on a ramp equipped with free-rotating rollers. The shape of this ramp is a straight line from F to G, and a circular arc of radius R between E and F.

The tangent to the ramp at point E forms the angle $\theta$ with the straight line FG.

The radius R is a radius of curvature acceptable for a pipeline of this type. Thus, in the example considered up to now, R would be $= 1,400r$ ($r$ being the outer radius of the steel pipeline) i.e. $R = 355$ m. (1,165 ft.) which corresponds to a stress of 14.3 kg./sq. mm. (20,340 p.s.i.).

With $EF = 15$ m. (ca. 50 ft.) the angle $\theta = 4.22\%$.

In order to have an idea of the behaviour of this layout when the swell is acting upon the pontoon, the action exerted by the pontoon movements respectively on a pipeline OA secured or fixed at A, and on a pipeline OA pivoted at A has been calculated.

(a) Pipeline secured at A

With:
$$\delta y = 1 \text{ m. (40'')}$$
$$\delta x = 0$$
$$\delta m = 0$$
we obtain:
$$\delta X = 2,940 \text{ kg. (6,500 lbs.)}$$
$$\delta Y = 1,000 \text{ kg. (2,205 lbs.)}$$
$$\delta \Gamma = 15,100 \text{ kgm. (109,000 ft.-lbs.)}$$

With:
$$\delta y = 0$$
$$\delta x = 0$$
$$\delta m = +2.5\%$$
we obtain:
$$\delta X = 6,180 \text{ kg. (13,600 lbs.)}$$
$$\delta Y = 2,480 \text{ kg. (5,460 lbs.)}$$
$$\delta \Gamma = 51,900 \text{ kgm. (374,500 ft.-lbs.)}$$

With:
$$\delta x = 0.75 \text{ m. (30'')}$$
$$\delta y = 0$$
$$\delta m = 0$$
we obtain:
$$\delta = 9,100 \text{ kg. (20,000 lbs.)}$$
$$\delta Y = 2,740 \text{ kg. (6,040 lbs.)}$$
$$\delta \Gamma = 54,100 \text{ kgm. (390,000 ft.-lbs.)}$$

(b) Pipe line pivoted at A

With:
$$\delta y = 1 \text{ m. (40'')}$$
$$\delta x = 0$$
we obtain:
$$\delta X = 1,163 \text{ kg. (2,565 lbs.)}$$
$$\delta Y = 482 \text{ kg. (1,062 lbs.)}$$
$$\delta m = -0.7\%$$

With:
$$\delta x = 0.75 \text{ m. } (30'')$$
$$\delta y = 0$$
we obtain:
$$\delta X = 2,740$$
$$\delta Y = 890$$
$$\delta m = -2.6\%$$
$$F + \delta F = 36T$$

Thus, if the pivotal mounting of the pipe line at A permits a variation of $m$ by ±5%, a longitudinal movement of ±0.75 m. (producing a variation of $m$ by ±2.6%) and a simultaneous synchronous pitch of ±2.5% are practically without any appreciable consequence from the point of view of stress created in the pipe line.

The device considered herein gives results lying between those of the pivotal mounting at A and those of the fitting at A, the latter being very close to those obtained with the pivotal mounting at A.

If in the mean position the pipe line is tangent to the ramp at F, it is possible to change the direction of A by about 4.2% (these figures being somewhat altered by the flexion of section AF) with the introduction of reduced stress.

Assuming a longitudinal movement of ±0.75 m. of the pontoon, combined with a synchronous pitch of ±2.5% which, in the case of the pivotal mounting at A, would cause the pipe line direction to vary at A by ±5.1%, the permissible stress limits would not be overstepped by using a steel grade having an elastic limit of 36 kg./sq. mm. (51,200 p.s.i.).

Care must be taken that during the movements of the pipe line laying pontoon which are caused by the swell the wraps remain tangent to the sea bottom at the point where they rise therefrom.

In fact, considering the fact that, with due regard for the masses thus set in motion, the action of these warps can scarcely limit the pontoon movements, if these warps were raised off the bottom until they pull directly on the anchor, sudden variations in the tension of the raised wraps would be produced, which would be highly detrimental to the strength of these warps and likely to increase the pontoon movements.

In order to have an idea on the action exerted by these warps, the following theoretical examples have been examined, under the same conditions as set forth hereinabove:

(a) Pipe line fitted or secured at A

Assuming the pontoon to be moored by 40-mm. (1.575") warps, the pair of front warps being slack and the pull being absorbed by the other pair of warps which are fastened to anchors spaced 360 m. (1,180 ft.) from the pontoon.

Static calculation of equilibrium according to:
$$\delta y = 1 \text{ m.}$$
$$\delta m = 0$$

the resultant is zero for the horizontal forces exerted by the pipe line and the two front warps.

As a result:

$\delta x = 0$ (the pipe line and the pair of front warps have the same stiffness)
$\delta X = 2,940$ kg. (6,500 lbs.)
$\delta Y = 1,000$ kg. (2,205 lbs.)
$\delta \Gamma = 15,100$ kgm. (109,000 ft.-lbs.).

Static calculation of the following equilibrium:
$$\delta y = 0$$
$$\delta m = +2.5\%$$

the resultant is zero for the horizontal forces exerted by the pipe line and the two front warps.

As a result:

$\delta x \neq 0$
$\delta X = 6,180$ kg. (13,600 lbs.)
$\delta Y = 2,480$ kg. (5,460 lbs.)
$\delta \Gamma = 51,900$ kgm. (374,500 ft.-lbs.)

(b) Pipe line fitted or secured at A

Assuming the pontoon to be moored by means of 40-mm. (1,575") warps, with the pair of front warps slack and the other pair of warps receiving the tension and being fastened to anchors spaced more than 500 meters (1,640 ft.) from the pontoon.

Static calculation of the following equilibrium:
$$\delta y = 1 \text{ m. } (40'')$$
$$\delta m = 0$$

The resultant is zero for the horizontal forces exerted by the pipe line and the two front warps.

As a result:

$\delta x = 0.125$ m. (6")
$\delta X = 1,415$ kg. (3,120 lbs.)
$\delta Y = 540$ kg. (1,190 lbs.)
$\delta \Gamma = 6,050$ kgm. (43,650 ft.-lbs.)

Static calculation of the following equilibrium:
$$\delta_y = 0$$
$$\delta_m = +2.5\%$$

with a zero resultant with horizontal forces exerted by the pipe line and the two front warps.

As a result:

$\delta x = -0.31$ m. (ca. 1 ft.)
$\delta X = 2,330$ kg. (5,130 lbs.)
$\delta Y = 642$ kg. (1,415 lbs.)
$\delta \Gamma = 29,550$ kgm. (213,200 ft.-lbs.)

The same result would be obtained with two 55-mm. (2.16") warps fastened to anchors spaced 360 m. (1,180 ft.) from the pontoon; the warps would remain tangent to the bottom at the point where they commence their upward curve.

The comparison between these different cases shows that so-called flexible warps, which remain tangent to the bottom at the point where they commence their upward curve, is a primary requirement.

To conclude with the warp question, it may be noted that in the laying of pipe lines under tension no shifting of the front anchors can be tolerated. Therefore, these anchors must be calculated with safety coefficients still higher than those approved for ordinary anchors.

Figure 5:
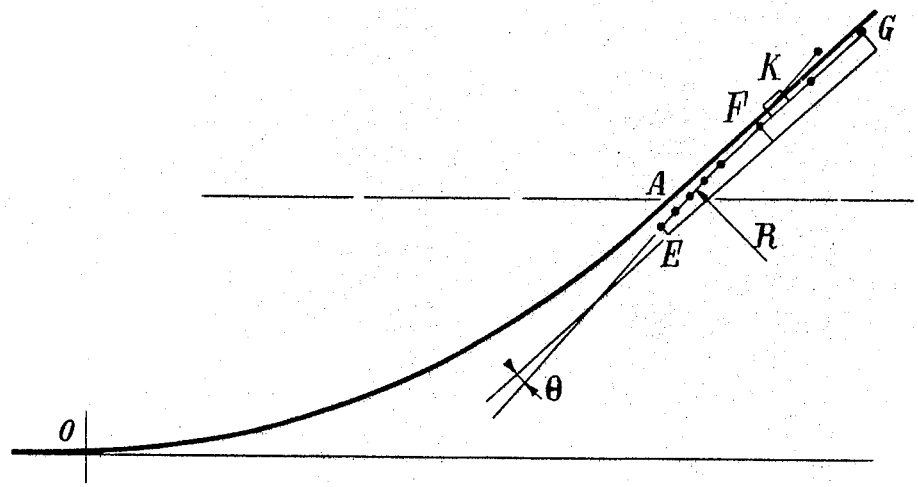

The action exerted by the forward movement of the pontoon on the stress applied to the pipe line in case of an exceptionally high swell has also been studied. The device illustrated in FIG. 5 is operated while moving the pontoon forwards by pulling the warps by means of their windlasses by a length $l$ corresponding to the length of the various sections of the pipe line before asembling same.

Pounding, generally well below the exceptional value of ±1 meter, will cause variations of F which are less than ±1.5T. The pitch is practically without any detrimental consequence.

As to the variation $\delta x = \pm 0.75$ m. (30"), it will determine variations of F of about ±3T.

The rods leading to collar K are fastened to a trolley movable along a ramp FG and secured in turn to a cable parallel to FG which constantly pulls this trolley upwards. This constant variation is obtained by causing the winch winding this cable to be responsive to tension variations, so that the effective tension remains within the range from $T_1$ to $T_2$.

In the case of a longitudinal movement of ±0.75 m. (30") of the pontoon with respect to its means position, if $T_2 > T_1 + 6T$, the constant-tension winch will constantly revolve in the same direction when the pontoon is moved forwards, the servo-action becoming effective to prevent the tension from exceeding $T_2$. If $T_2 - T_1 < 6T$, the trolley will oscillate about a mean position moving as the pontoon progresses. The winch used for winding and unwinding the cable will attain speeds higher than those of the adjustment: $T_2-T_1>6T$ and it will be necessary to either resort to means for recovering an otherwise lost energy or to implement higher power outputs.

Figure 6:
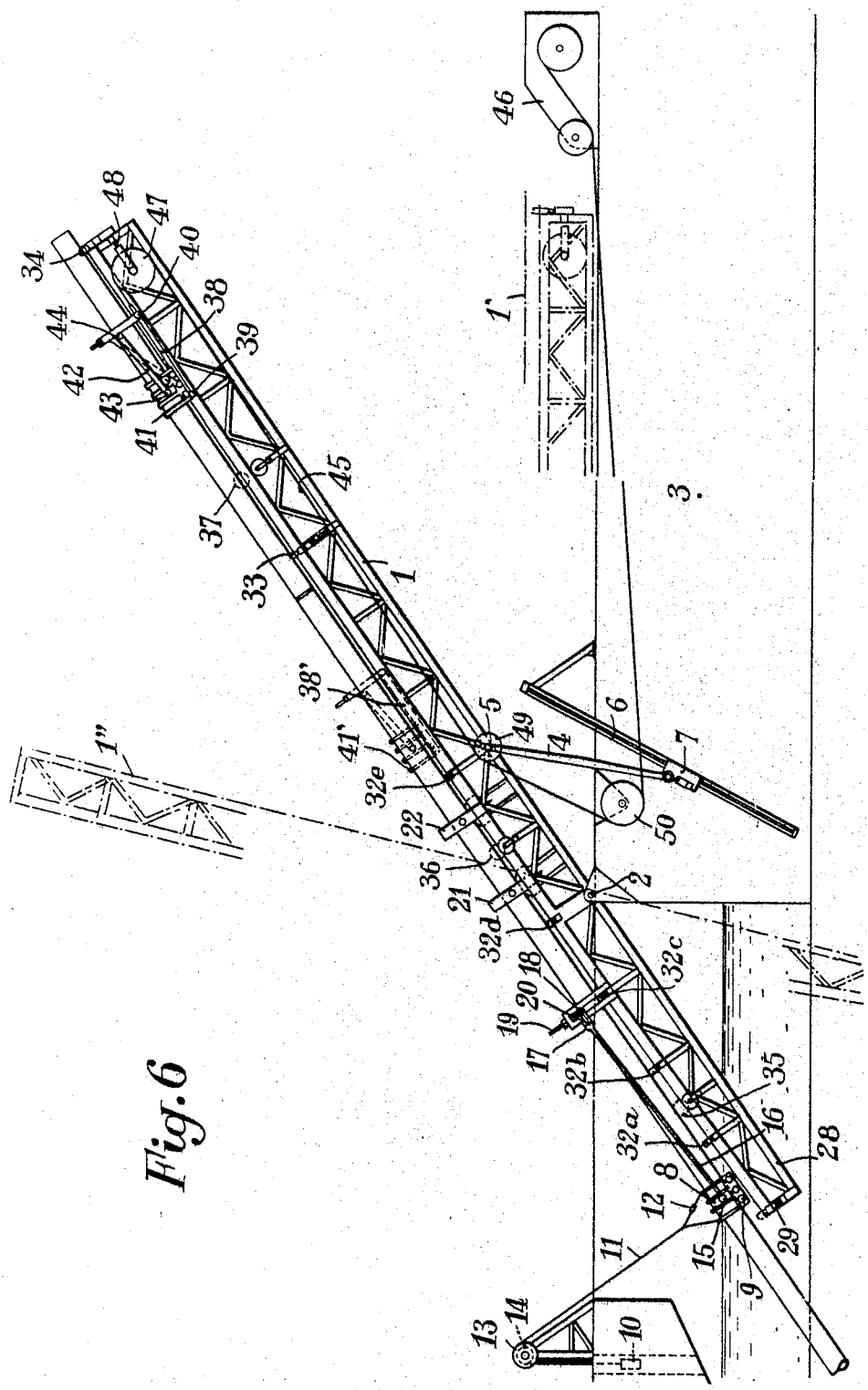
FIGS. 6 and 7 are side elevational views showing on a larger scale a typical form of embodiment of this invention.

More particularly, devices of which the behaviour has been studied hereinabove may be used in the manner illustrated in FIGS. 6 and 7.

On a beam 1 pivoted about a transverse shaft 2 secured to the pontoon 3, and adjustable between two end positions 1' and 1" by means of a rod system 4 having one end pivotally connected at 5 and the opposite end pivoted to a member 7 movable along a rack 6, there are mounted:

(a) A clamping collar 8 equipped with motor-operated cylinder-and-piston actuators 9 and balanced by counterweights 10 through the intermediary of a rope 11 provided with an inclination adjustment device 12 and adapted to be wound on a drum 13, said counter-weights 10 being rotatably solid with pulleys 14; however, this balancing layout is given by way of example only and should not be construed as limiting the invention.

The clamping collar 8 comprises a trunnion 15 and is connected by means of rods 16 provided with elongated holes 17 to a transverse shaft 18 adapted to be positioned in relation to the beam 1 by means of a screw 19 controlling the movement of a frame 20.

Figure 8:
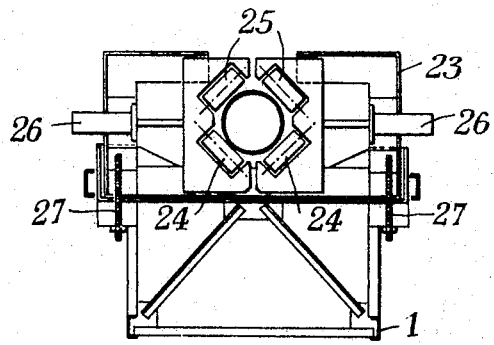
FIGS. 8 and 10 are detail views showing on a still larger scale certain component elements of the device.

(b) Means for locking the pipeline both in inclination and in direction, which comprise the devices 21 and 22 consisting each of a frame structure 23 rigid with the beam 1 and of two sets of rollers 24 and 25 adapted to be shifted horizontally by means of actuators 26, the vertical adjustment of the position of these sets of rollers being controlled by means of a screw device 27 (FIG. 8).

Figure 9:
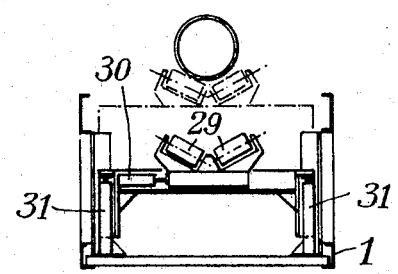
Figure 10:
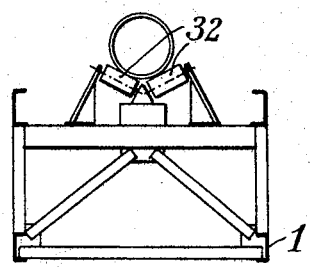

(c) A curved end ramp 28 forwardly and downwardly inclined provided with supporting sets of rollers 29 and 32, the first set 29 being adjustable by means of actuators 30 and 31 (FIG. 9) and adapted to be retracted completely, while the different sets 32a to 32d are secured to this ramp (see FIG. 10).

(d) The beam 1 is also equipped with:

(1) Two sets of rollers 33 and 34 adjustable vertically and horizontally by means of motor-operated cylinder-and-piston actuators, so that the pipe line section to be secured to the end of the pipe line elements being laid can be positioned with a relatively high degree of precision;

(2) Three grooved pulleys 35, 36 and 37 for guiding the cable during certain pipe line laying operations, which pulleys are adjusable by means of motor-operated actuators (not shown).

(e) It eventually comprises a pipe line laying trolley 38 comprising a frame structure equipped with rollers 39 and 40, and a clamping collar 41 provided with links 42 pivotally connected at one end to a trunnion 43 of collar 41 and at the other end to a vertically adjustable shaft 44.

This laying trolley 38 is displaceable from its uppermost position 39 to its lowermost position 38' and it will be noted that the movable systems consisting of the rollers 33 and pulley 37 must be retractable sufficiently to permit this trolley movement.

The pipe line laying trolley 38 is connected through a cable 45 to a winch 46 responsive to the variations in the cable tension. This cable 45 passes in succession over the head pulley 47 provided with a tensioning bar 48, another pulley 49 and the return pulley 50.

During a normal pipe line laying operation the above-described device operates as follows:

From the sea depth diagram established along the path contemplated for the pipeline laying operation a chart is drawn showing all the successive depths likely to be dealt with during the operation, with due consideration for the surface movement caused notably by tide conditions.

The horizontal component X of the tension force F is selected for each depth, and in case the torque $\Gamma$ applied at A to the pipeline were zero, the vertical component Y and the slope $m$ of the pipe line at A are calculated, and furthermore the length $a$ of the horizontal projection of OA. X is selected higher than the permissible minimum value so that, taking due account of the variations $\delta X$, $\delta Y$ and $\delta \Gamma$ which will be caused by the swell action, the stress produced in section OA will leave the necessary margin with respect to the permissible stress values as a consequence of possible currents. In the following disclosure F denotes the selected pipeline laying tension as a function of the depth at O.

Let us consider the laying cycle at the time when, the pipeline being clamped in the collar 41, the pontoon is moved forwards by actuating its anchor windlasses. The other collar 8 is open, the direction-fixing roller supports 21 and 22 are open. The pine line may receive reactions directed at right angles to its longitudinal axis from rollers 29 and 32a to 32e and, at the beginning of the operation, also from roller 34. The collar 41 exerts on the pipe line a force of which the component parallel to the ramp equals the cable traction, this traction being caused to vary between $F_2-f$ and $F_2+f$ by the winch adjustment.

The force $F_2$ is so calculated that, considering the depth at O, the equilibrium O41 be obtained from the point of view of stress with a tension within the limits $F_2-f$ to $F_2+f$, $2f$ being greater than the tension variations that would result from the swell action if the collars 41 were stationary. The ramp slope $m$ corresponds to the preceding equilibrium OA under a tension F.

The pipe line laying pontoon is moved forwards, and the tension responsive winch pays out the cable 45 until the collar 41 is approximately in position 41'. Then the winch adjustment is modified so that its tension will now lie between $F_1'-f$ and $F_1'+f$, $F_1'$ for the equilibrium O'41' corresponding to F', which is the tension selected for O'A'. The trolley 38 to which the collar 41 is secured is shifted when the winch adjustment is modified. Then the collar 8 is clamped, the cable tension is reduced to zero, thus transferring the tension exerted on the pipe line from collar 41' to collar 8. The mean end tension approximates F'. It may be noted that the choice of $F_2$, $F_1$ and F' was made possible because the depths at O and O' are known, the pontoon equipped with an echo sounder having already passed above these points during the preceding pipe line laying operations.

Then the ramp is set at an angle $m'$ corresponding to F' and to the depth at O'. The pipe line inclination at A' is measured by means of an inclinometer (this inclination varying under the influence of swell) and the ramp adjustment is completed by setting same at the measured mean inclination. Then the direction-setting roller supports 21 and 22 are closed. The pipe line is ready for connecting another pipeline section thereto. Its end performs only small longitudinal movements corresponding to the swell frequency.

Then, by using a hoisting tackle, the new pipe line section to be connected is placed upon the positioning rollers 33 and 34 which are movable in relation to the ramp along two axes perpendicular to the ramp axis. This section i sadded to the preceding one and temporarily secured thereto by means of a suitable device, for example a clamp. The coupling is carried out according to the selected procedure, such as manual or automatic welding, under inert gas or by flux-welding, screwing, etc. If desired, the pipe line coatings are interconnected. Then the direction setting roller carriers 21 and 22 are opened and the tension can now be transferred from collar 8 to collar 41 returned to its uppermost position.

The roller 33 is lowered and the trolley is brought to position 38'. Then after having properly adjusted the winch with a $2f'$ sensitivity (as a rule, in the case of regularly varying depths $f=f'$), the mean value of the cable tension is increased until the rods 16 for fastening the collar 8 move forwards in relation to the transverse shaft 18, this movement being permitted by the lost motion provided at the fastening point. The collar 8 is opened. Then the winch adjustment is changed to cause the tension to vary between $F'_2-f'$ and $F'_2+'$, $F'_2$ corresponding to the equilibrium $O'41$. Finally, a complete cycle has thus been performed.

A current pipeline laying operation may have to be interrupted notably as a consequence of bad weather likely to create sea conditions likely to compromise the success and the safety of the operation.

Under these circumstances, the pipeline laying operation must be held up temporarily and the previously assembled pipeline must therefore be laid on bottom and raised again when fair weather conditions are restored.

Figure 7:
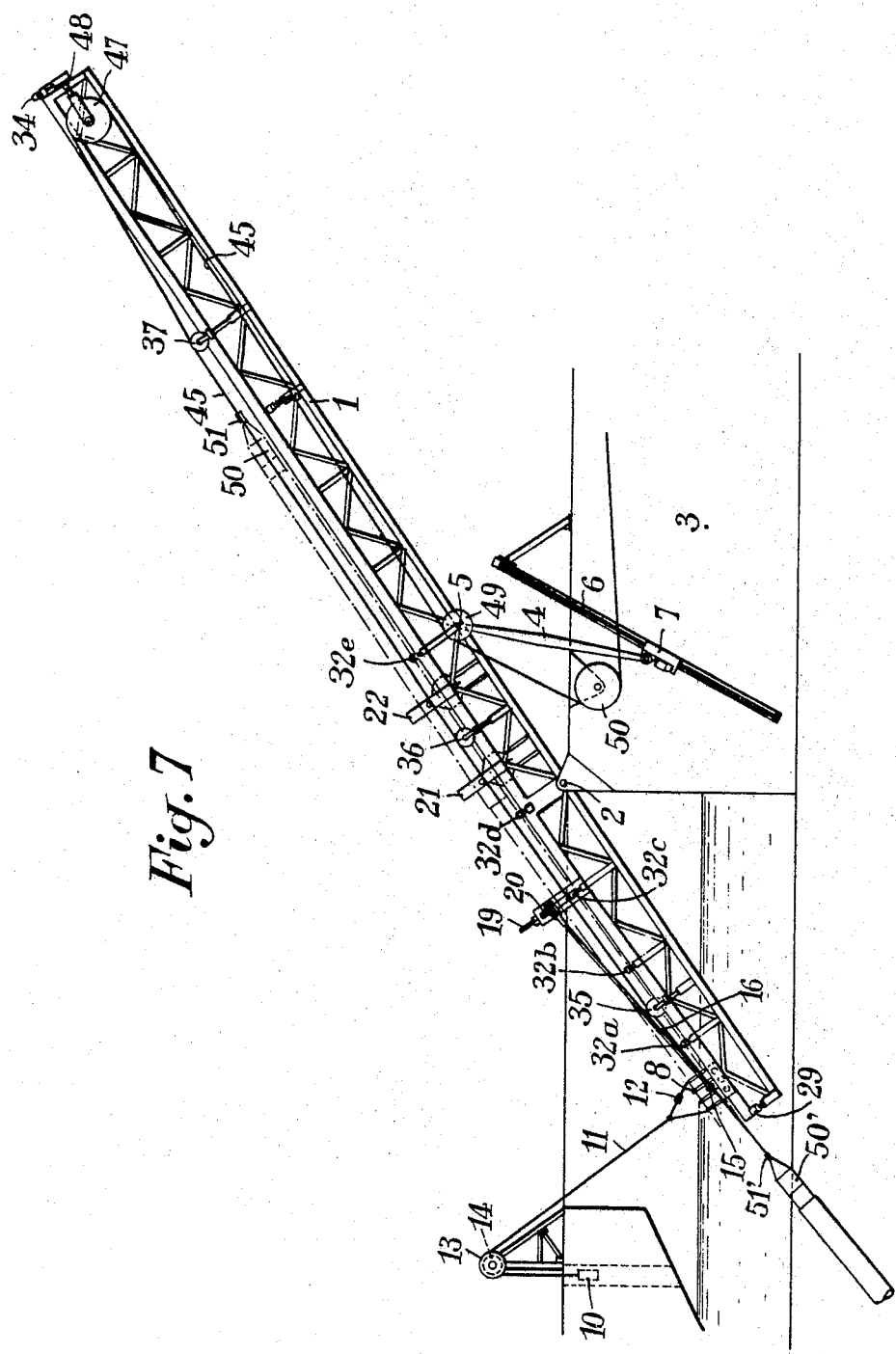

Therefore, the operation consisting in adding a new pipe line section to the previously assembled ones must be postponed at a certain time, this new section being replaced in this case by a special head 50 adapted to seal the open end of the pipe line and provided with two flanges and an axial shaft 51 (FIG. 7).

The elements are positioned as in the case of a normal pipeline connecting operation, then the cable 45, instead of being attached to the trolley 38, is secured to said axial shaft 51.

The set of rollers 29 are lowered and the grooved pulley 37 is raised so that the traction of cable 45 can be exerted in a direction substantially coaxial with the pipeline.

Having adjusted the winch with a sensitiveness 2 (which is greater to the tension variations likely to be caused by the swell action is windlass were not rotating, the cable tension is increased until the rods 16 securing the collar 8 move forwards in relation to the adjustment screw 19 of frame 20. Then collar 8 can be opened.

Then the windlass setting is modified so that the tension will vary between $F_2-$ and $F_2+$, $F_2$ being calculated to obtain a satisfactory equilibrium O, 51.

The pipe line laying pontoon is subsequently moved forwards by operating the mooring windlasses, and the pipe line sinks gradually to the bottom.

When the head shaft 51 clears the grooved pulley 36, the latter is set to its high position. The same operation is carried out with grooved pulley 35, the purpose of these two operations consisting in maintaining the direction of the traction effort of cable 45 in alignment with the pipe line axis. Thus, the pipe line can be cleared completely from the beam 1.

During this operation, the collar 8 did not interfere whatsoever with the slipping movement of the pipe line, said collar being open and balanced by its counter-weight system.

The operation is continued by applying the method disclosed and illustrated in the applicant's French Pat. No. PV. 66,144 of June 20, 1966.

The pontoon is moved forwards until the vertical plane containing the axis of grooved pulley 35 is spaced from point 0 by a distance greater than D which is subordinate to the pipe line laying conditions (such as the pipe line characteristics and laying depth).

Then, the tension of cable 45 is reduced from $F_2\pm f$ to zero $\pm f$ without operating the pontoon windlasses.

The pipe line is then laid on the sea bottom.

For raising it again, the reverse procedure is adhered to so that the tension of cable A5 changes from zero $\pm f$ to $F_2\pm f$, and the pontoon is moved until the distance from the vertical plane cantaining the axis of grooved pulley 35 and point 0 is greater than D.

The pipe line is raised as described in the above-mentioned applicant's patent and when the pipe line end has overstepped the set of rollers 29 these are moved to their uppermost position in order to cause the pipe line to rise on the ramp 28 equipped with rollers 32a and 32e.

Then the upward movement is continued by retracting first the grooved rollers 35 and then the similar rollers 36.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A device for laying pipelines on the sea bottom from a pontoon according to the so-called pure-tension method, which comprises on said pontoon a rectilinear pipeline laying beam pivotally mounted on the portion intermediate of its ends, with one end thereof extending over the water body, a pair of relatively long rods pivotally mounted about a fixed transverse axis connected to said laying beam, a collar adapted to clamp the pipeline end and pivotally mounted about a transverse axis at the end of said relatively long rods, in combination with two sets of rollers having their supports also rigid with said pipeline laying beam, said sets of rollers being each adapted to clamp said pipeline while permitting slight movements thereof along its axis, and means for adjusting the relative position of said axis of said pipeline and said sets of rollers with respect to the pontoon in order to provide the inclination consistent with the pipeline laying conditions.

2. A device as set forth in claim 1, comprising a trolley adapted to roll along said laying beam, a cable adapted to exert a tractive effort on said trolley, a pair of rods pivotally mounted about a transverse axis carried by said trolley, and a second collar pivotally mounted about a transverse axis at the opposite ends of said last-named rods and adapted to clamp the end of the last pipeline section previously assembled to the main pipeline body.

3. A device as set forth in claim 2, wherein the lower portion of the pipeline laying beam has an extension forwardly and downwardly inclined, in the form of a longitudinal circular ramp, the tangent to the upstream end of said circular ramp being parallel to said rectilinear beam, and rollers having transverse axes mounted on said ramp.

References Cited

UNITED STATES PATENTS

| 2,735,270 | 2/1956 | Collins | 61—723 X |
| 3,389,563 | 6/1968 | Postlewaite et al. | 61—723 |

FOREIGN PATENTS 885,276   12/1961   Great Britain.

JACOB SHAPIRO, Primary Examiner